United States Patent [19]
Kuhlman

[11] Patent Number: 5,735,073
[45] Date of Patent: Apr. 7, 1998

[54] FISH BITE INDICATOR FOR MOUNTING ON FISHING ROD

[76] Inventor: Donald J. Kuhlman, 15570 Comstock St., Grand Haven, Mich. 49417

[21] Appl. No.: 627,883

[22] Filed: Apr. 3, 1996

[51] Int. Cl.⁶ .................................................. A01K 97/12
[52] U.S. Cl. ........................................................ 43/17; 43/25
[58] Field of Search ........................ 43/17, 25; 24/115 A, 24/129 W

[56] References Cited

U.S. PATENT DOCUMENTS

| | | | |
|---|---|---|---|
| 1,070,948 | 8/1913 | Dodd | 24/115 A |
| 2,101,681 | 12/1937 | Josephs | 24/115 A |
| 3,143,822 | 8/1964 | Schooley | 43/17 |
| 3,529,375 | 9/1970 | Dey | 43/28 |
| 3,916,554 | 11/1975 | Hullett | 43/17 |
| 4,020,579 | 5/1977 | Snider | 43/17 |
| 4,399,631 | 8/1983 | Smith | 43/17 |
| 4,507,890 | 4/1985 | Thorne | 43/17 |
| 4,905,398 | 3/1990 | Botbyl | 43/17 |
| 5,068,948 | 12/1991 | Blankenship | 24/115 A |
| 5,287,646 | 2/1994 | Kuhlman | 43/25 |

*Primary Examiner*—Kurt Rowan
*Attorney, Agent, or Firm*—Alfred E. Smith

[57] ABSTRACT

An extremely sensitive stainless steel bobber that will fit practically any fishing rod or pole. The bobber includes a first loop through which a fishing line passes; a second, very flexible loop for sensing pull exerted on the fishing line; a securing assembly for mounting the bobber on the end of a fishing pole or rod; and an indicator for signaling the presence of a biting fish.

3 Claims, 2 Drawing Sheets

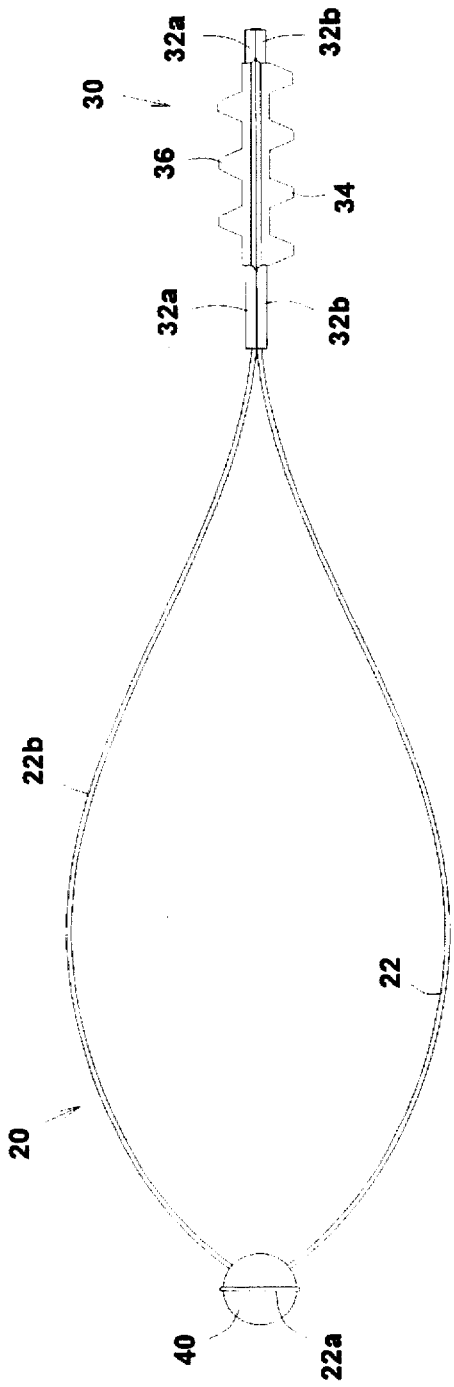
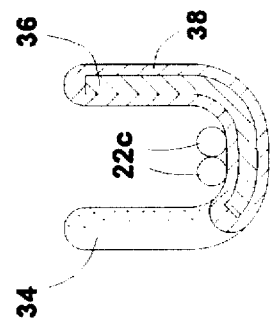
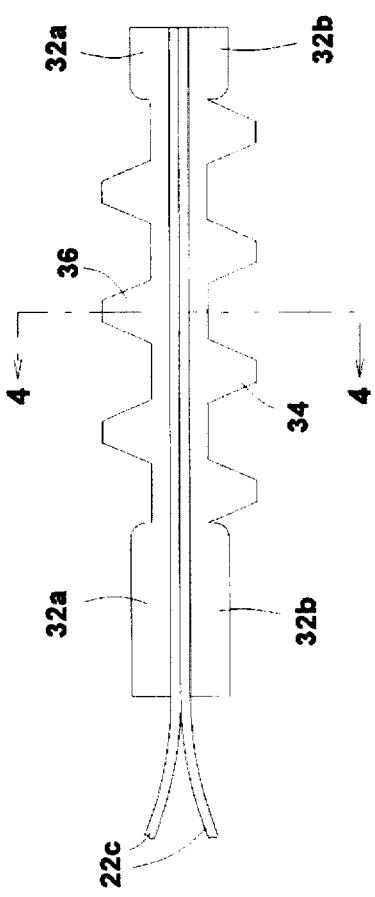

FISH BITE INDICATOR FOR MOUNTING ON FISHING ROD

BACKGROUND OF THE INVENTION

The present invention relates to fishing equipment and more particularly to an extremely sensitive spring bobber. This invention is related to applicant's previous U.S. Pat. No. 5,287,646 issued Feb. 22, 1994. The spring bobber is attached to the tip of a fishing rod (or pole) and replaces the conventional floating bobber.

When the spring bobber described herein is installed on a fishing rod the rod tip will become extremely sensitive. The spring bobber acts as a shock absorber permitting a fisherman to see and feel the first sign of a biting fish—a direct signal from the mouth of the fish to the end of the rod. The spring bobber can be used with spinning rod, bait casting rod or a pole. It can be used for ice fishing, drift fishing or still fishing.

The most pertinent prior art know to applicant relating to the instant invention is U.S. Pat. No. 4,020,579 issued to Snider on May 3, 1977. Snider discloses a bite signaling device for attachment to a fishing pole or rod having a support sleeve mounted on the outer end of the pole or rod. Snider's signaling device is clipped onto the support sleeve by means of an elongated longitudinally slotted sleeve member.

SUMMARY OF THE INVENTION

The invention relates to a spring bobber of the type disclosed in applicant's previous U.S. Pat. No. 5,287,646 having a new and improved element for attaching the spring bobber to a fishing rod. The sensing element of the bobber is formed from a single strand of stainless steel wire. The wire is bent to form a first loop through which a fishing line can pass, a plastic bead providing a signaling member is placed on the wire adjacent the first loop. A second much larger loop is formed at a right angle to the first loop providing an extremely flexible member. The remainder of the wire is then bent to form a pair of parallel terminal sections. This sensing element is secured to the end of the rod by means of a rubber dipped clip member which will be described in detail below.

It is an object of the present invention to provide an extremely sensitive fish bite indicator that is adaptable to most fishing rods, will not damage the fishing rod when properly installed and will not alter or change the action of the fishing rod.

It is a further object of the present invention to provide a clip element for removably securing the fish bite indicator to a fishing rod or pole.

These and other objects of the invention of the present invention will become apparent upon reference to the following detail description considered with the accompanying drawings.

BRIEF DESCRIPTION OF THE DRAWINGS

FIG. 2 is a bottom view of the spring bobber attached to the clip element of the invention.

FIG. 3 is a view of the clip before being attached to the spring bobber.

FIG. 4 is an enlarged sectional view taken along lines 4—4 of FIG. 3.

DETAILED DESCRIPTION OF THE INVENTION

Figure 1:
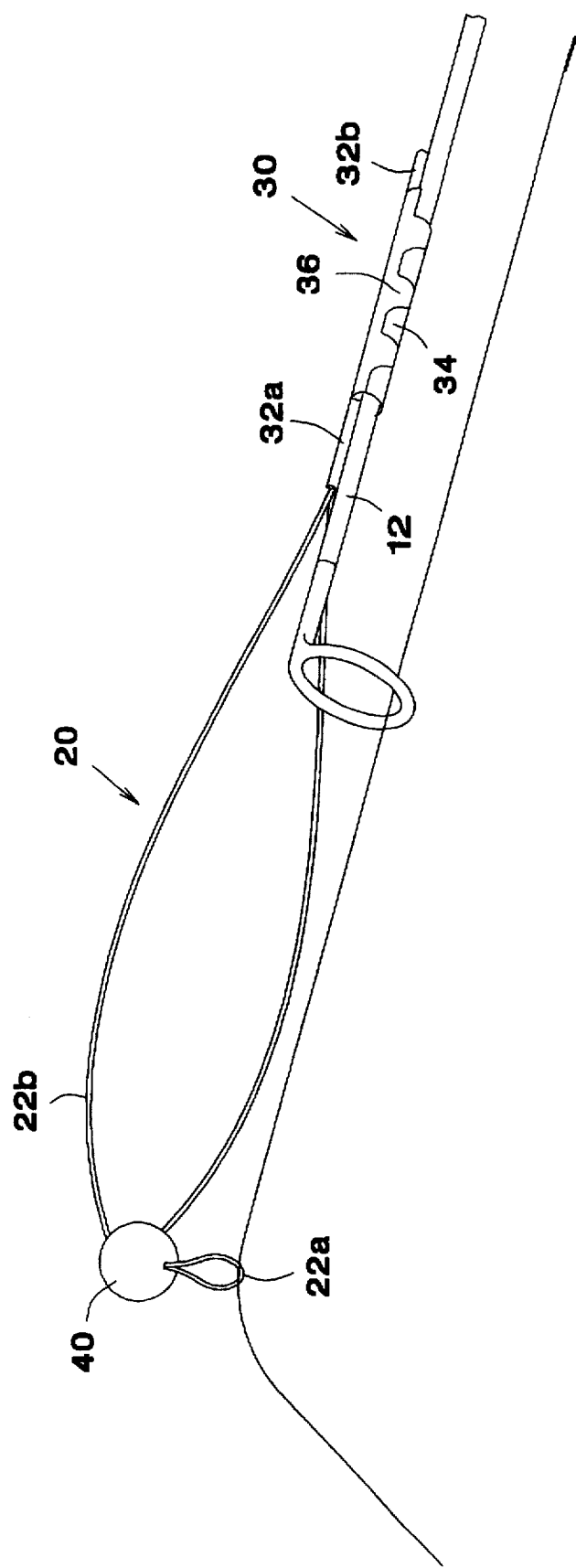
FIG. 1 is a perspective view of a preferred embodiment of the invention attached to a conventional fishing rod.

Referring to FIG. 1 fishing rod 10 includes one or more rod members 12 and a plurality of line-guide eyes 16a and 16b. The spring bobber 20 is mounted on the terminal end of the rod member 12 and includes a bite sensing element 22 and a securing clip 30. The bite sensing element is formed from a single strand of stainless steel wire to provide a loop 22a, through which a fishing line 19 passes, a larger loop section 22b; and terminating in a pair of parallel sections 22c. The large loop section 22b provides an extremely sensitive detector for sensing any force applied to loop 22a as a result of a biting fish pulling on line 19. Any deflection of loop 22b is signaled by an indicator or a colored plastic sphere 40 positioned between small loop 22a and large loop 22b. The loop 22b is configured to be large enough to completely clear the tip guide-eye 16a when a biting fish pulls on line 19. This large loop feature makes the bobber both extremely sensitive and castable.

The specific details and method of attaching the spring bobber to a fishing rod are shown in FIGS. 2 and 3. FIG. 2 shows the clip 30 in blank form. Clip 30 is formed of aluminum and as can be seen has a plurality of serrations 34 and 36 on opposite sides of the blank. Note also that the serrations 34 and 36 are staggered so that when they are crimped about the rod member 12 they are substantially in abutting contact with each other so as to form a cylinder surrounding member 12. It is also seen that the clip blank 30 is provided at its end portions with serrations 32a and 32b, each pair of serrations 32a and 32b forming a tab. The blank 30 is formed into a generally U-shaped configuration, the parallel terminal sections 22c are placed within the clip 30 and the serrations 32a and 32b are crimped to secure the sections 22c within the U-shaped member along a longitudinal axis as is clearly shown in FIGS. 1–3. At this time the clip 30 is rubber dipped providing a rubber coating 38 as shown in FIG. 4 to protect the rod and also to provide for a tighter grip to the rod. The assembled spring bobber and clip are shown in FIG. 3 in the final form which is ready to be attached to the end of a fishing rod. The attachment to the rod is accomplished by simply placing the clip on the rod immediately to the rear of the tip guide eye 16a and closing the serrations 34 and 36 around the rod, using either a tool or even a coin to push or bend the serrations tightly into contact with the rod. As shown in FIG. 1 the terminal ends of wire 22 lie along an axis that is offset from and parallel to the axis of the cylinder formed by serrations 34 and 36.

While this invention has been described with reference to a specific embodiment it will be apparent that various changes and modifications may be made without departing from the spirit of the invention as defined in the appended claims.

I claim:

1. A spring bobber for use with a fishing rod comprising: a fish bite sensing member consisting of a wire having an indicator mounted thereon and having a distal end portion forming a loop through which a fishing line passes, a central flexible loop portion lying in a plane perpendicular to the plane of said distal end portion loop and having a diameter substantially greater than the diameter of said distal end portion loop, and parallel terminal end portions; a clip for securing said sensing member to a fishing rod, said clip comprising a generally U-shaped member having a tab member at each end thereof engaging said parallel terminal end portions and a plurality of serrations intermediate said tab members thereby securing said spring bobber to said fishing rod.

2. A spring bobber as set forth in claim 1 wherein said plurality of serrations are substantially in abutting contact with one another so as to form a cylinder surrounding said fishing rod.

3. A spring bobber as set forth in claim 2 further including a rubber coating on said clip.

* * * * *